No. 12,774. REISSUED APR. 7, 1908.

T. CARROLL.

CASH REGISTER.

APPLICATION FILED DEC. 11, 1907.

5 SHEETS—SHEET 1.

Witnesses

Earl M. Benst.

Inventors

Thomas Carroll by J. B. Hayward and R. Schlaes

Attorneys

No. 12,774. REISSUED APR. 7, 1908.

T. CARROLL.

CASH REGISTER.

APPLICATION FILED DEC. 11, 1907.

5 SHEETS—SHEET 2.

Witnesses

A. Foster.

Carl H. Benst.

Inventors

Thomas Carroll by J. B. Hayward and R. Ralston

Attorneys.

No. 12,774. REISSUED APR. 7, 1908.

T. CARROLL.

CASH REGISTER.

APPLICATION FILED DEC. 11, 1907.

5 SHEETS—SHEET 3.

Witnesses

C. Hinton

Earl W. Beust.

Inventors

Thomas Carroll by J. B. Hayward and R. Ashton

Attorneys

No. 12,774. REISSUED APR. 7, 1908.

T. CARROLL.

CASH REGISTER.

APPLICATION FILED DEC. 11, 1907.

5 SHEETS—SHEET 4.

Witnesses

[illegible]

Earl W. Burst.

Inventor

Thomas Carroll by J. B. Hayward and R. Ashton

Attorneys

No. 12,774. REISSUED APR. 7, 1908.
T. CARROLL.
CASH REGISTER.
APPLICATION FILED DEC. 11, 1907.
5 SHEETS—SHEET 5.
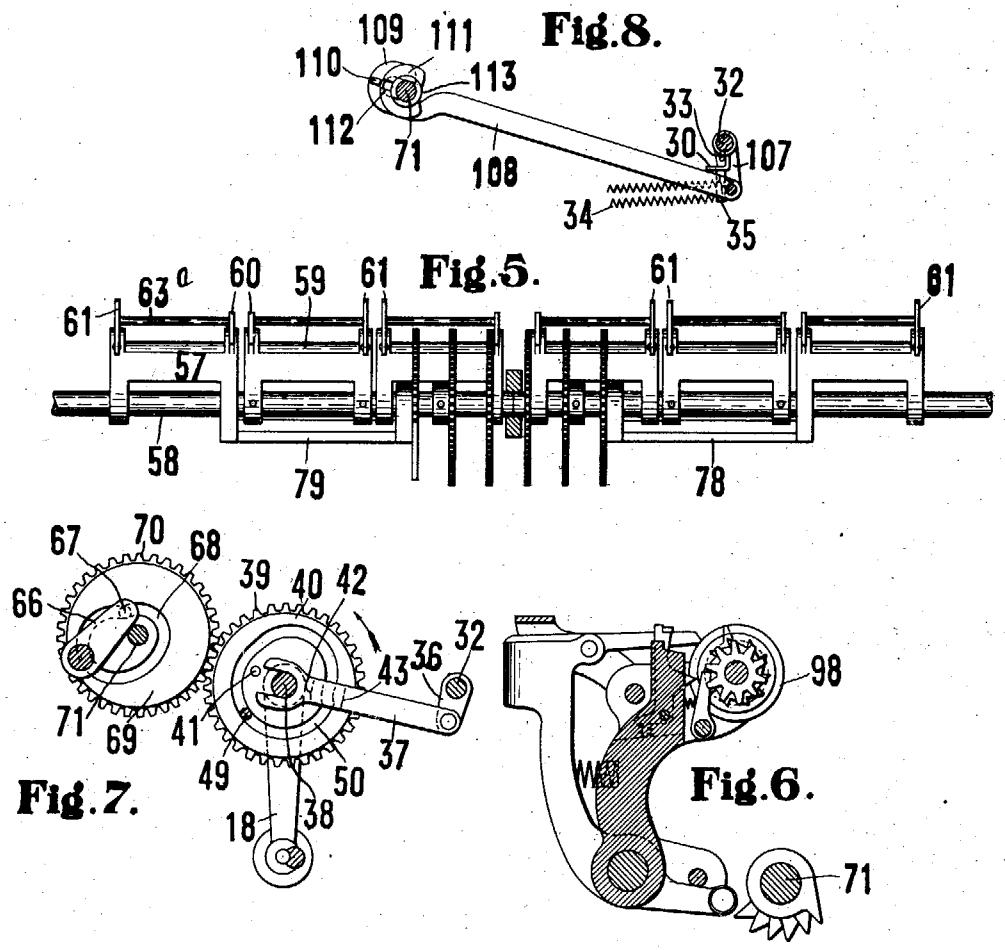
Witnesses
Carl M. Benst.
Inventors
Thomas Carroll
by J. B. Hayward
and R. R. Sloan
Attorney.

UNITED STATES PATENT OFFICE.

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

No. 12,774. Specification of Reissued Letters Patent. Reissued Apr. 7, 1908.

Original No. 864,511, dated August 27, 1907, Serial No. 130,766. Application for reissue filed December 11, 1907. Serial No. 406,119.

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers and has more particular relation to improvements in registers of the so-called two motion type, in which a key is first operated or set and a suitable actuator subsequently set in motion to complete the operation.

One of the objects of the invention is to provide an improved construction whereby the counter and indicator operating parts may be left in their set positions at the end of each operation.

The invention consists in certain novel constructions, combinations and arrangements of parts, all of which will be hereinafter more particularly set forth and claimed.

Figure 1:
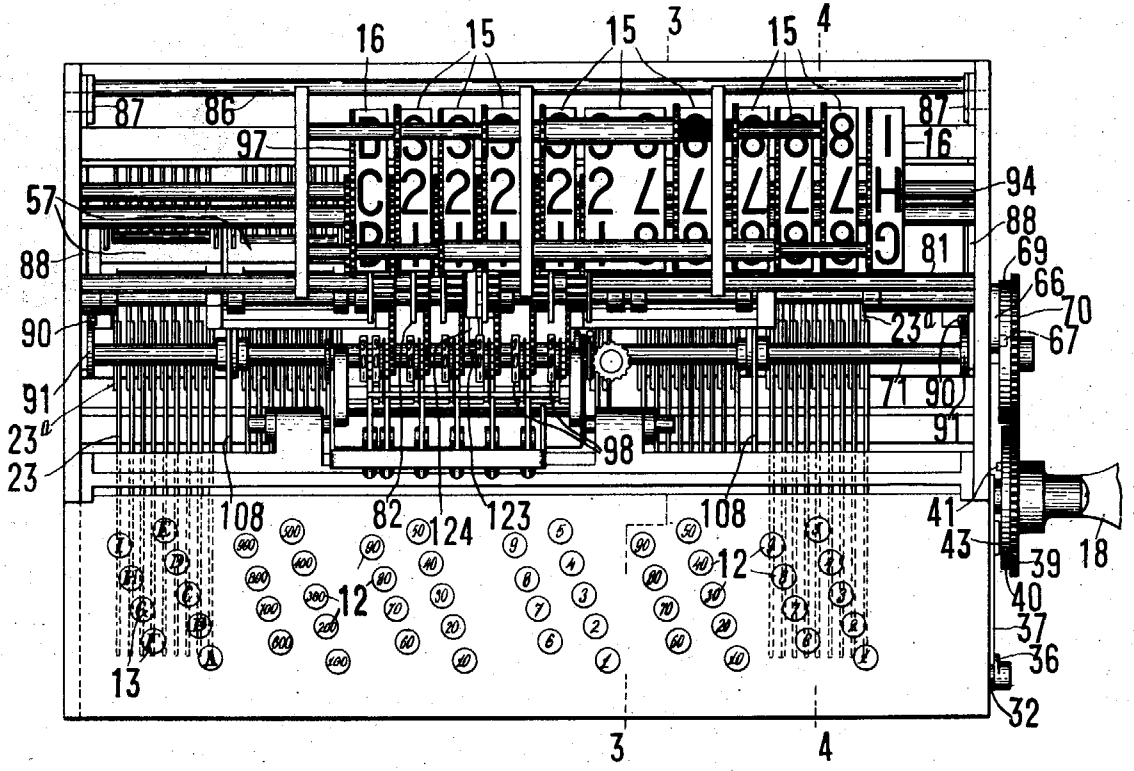
Figure 2:
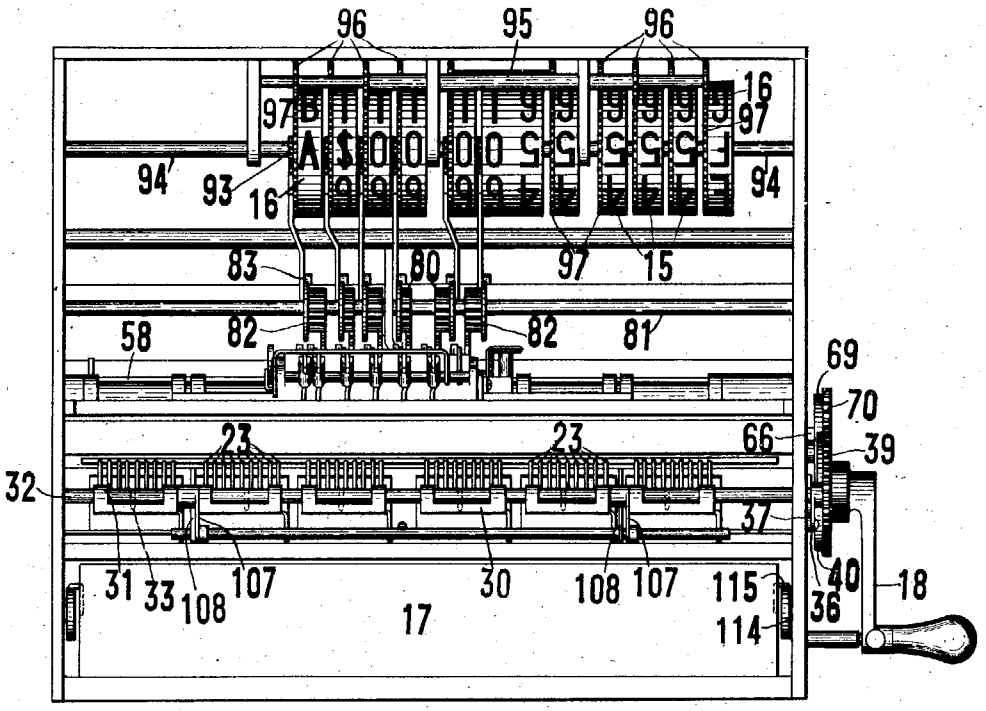
Figures 3, 9:
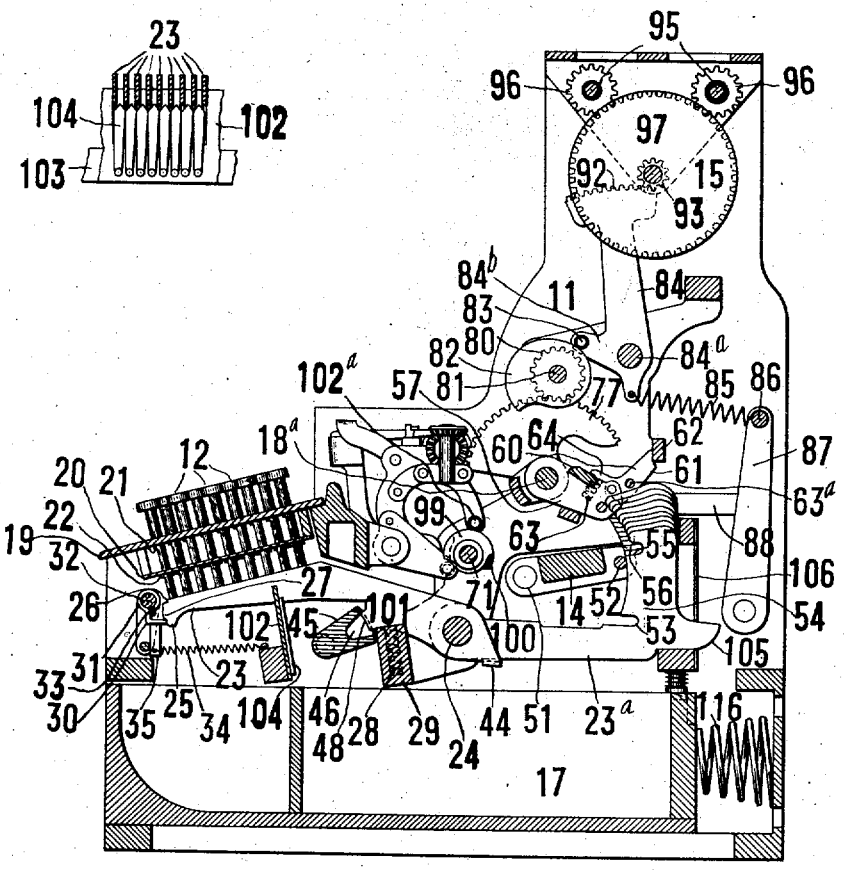
Figure 4:
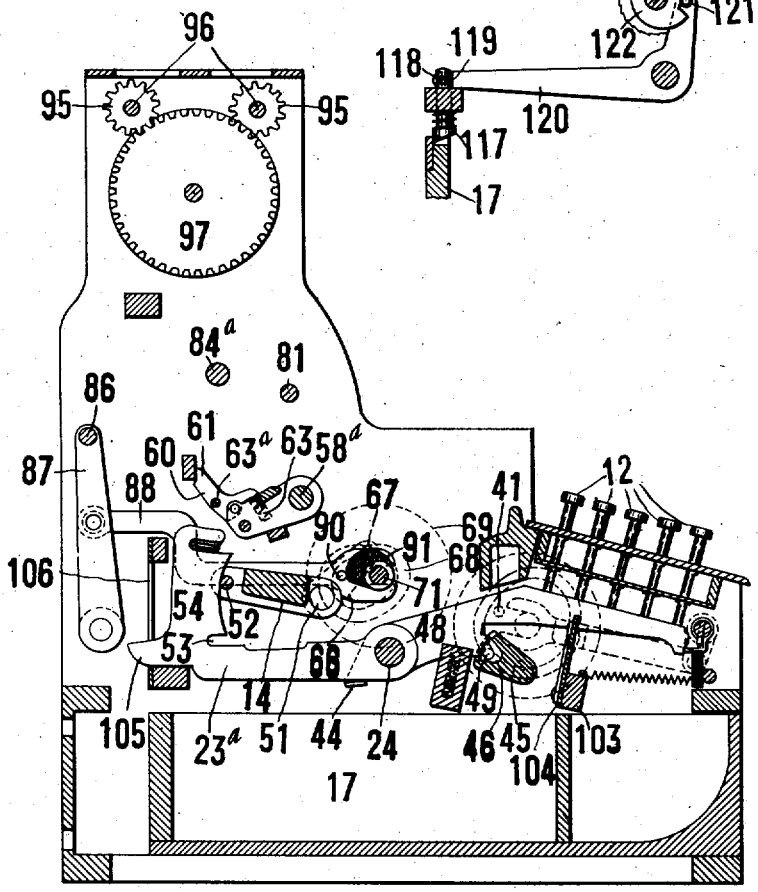
Figure 10:
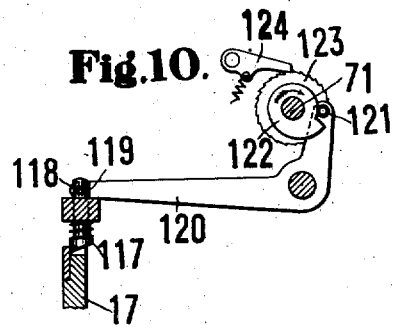

In the accompanying drawings forming part of this specification: Figure 1 represents a top plan view of a machine embodying my invention, with the cabinet removed and the operating handle broken away. Fig. 2 represents a front elevation of the same. Fig. 3 represents a vertical transverse section through the said machine on the line 3—3 of Fig. 1. Fig. 4 represents a similar section looking from the opposite direction on the line 4—4 of Fig. 1. Fig. 5 represents an enlarged detail top plan view of the registering frames and their respective rack segments and connections. Fig. 6 represents an enlarged detail vertical section through the counter, counter frame and the transfer operating cams. Fig. 7 represents a detail end elevation of the crank handle and operating gears. Fig. 8 represents a detail end elevation partly in section of one of the key detents and the locking devices coöperating therewith. Fig. 9 represents a detail rear elevation of a number of the key stops showing the key levers in section. Fig. 10 represents a detail side elevation of the full stroke device, the drawer latch, and its connections.

In the aforesaid drawings 11 represents the main frame, 12 the amount keys, 13 the special or clerk's keys, 14 the key coupler, 15 the amount indicators, 16 the special indicators, 17 the cash drawer and 18 the operating crank handle.

Described in general terms the machine may be said to comprise a series of depressible keys, which when operated set a series of key levers for operation in connection with a common key lever actuating member. These levers in turn set graduated registering levers for operation by a common key coupler. The movements of the registering levers are communicated to a series of registering frames. These frames operate in such manner as to set the indicators and remain stationary after such setting operation until the succeeding operation of the machine. The registering frames also carry racks for operating the counter.

The aforesaid keys 12 and 13 are mounted in groups or banks, as plainly shown in Fig. 1 and represent respectively units of cents, tens of cents, units of dollars, tens of dollars, hundreds of dollars and a series of special clerk's characters. Each of the keys comprises a suitable marked head and a pendent shank mounted in spaced guide plates 19 and 20. Each of the shanks is formed with a stop shoulder 21 which limits the downward movement of the key. A transverse pin 22 in each shank limits the upward movement of the key. These keys at their forward ends, rest upon a series of levers 23 which are pivoted upon a transverse shaft 24 mounted in the main frame. Each of these levers is formed with a stop nose 25, a locking shoulder 26 and a bevel edge 27. The key levers of the respective banks, as shown in Fig. 3 are held in normal position by a series of coil springs 28, which are mounted in a socketed cross bar 29 of the main frame and engage the lower edges of the key levers.

A series of detent plates 30 are loosely mounted by suitable sleeves 31 upon a rock shaft 32 extending entirely across the machine and are caused to move with the shaft by pins 33 mounted on said shaft and engaging said frames. This connection also permits independent movement of the detents. Each of the banks is provided with one of the detents 30 and each of these detents is normally drawn forward into contact with the noses 25 of its respective key levers by a coil spring 34 which connects a pendent arm 35 of the detent with the main frame. It will be seen from the above, that while the detents may move independently of the shaft to a slight degree to allow keys in different banks to be successively depressed, all of said detents may be simultaneously rocked out of engagement with the respective key levers by rocking the shaft. When one of the key levers is depressed by the operation of its key, its beveled or inclined edge 27 forces the detent forward until the shoulder 26 is brought into alinement with said detent, when the latter again springs forward to latch the key lever in its depressed position from which it is released only upon the rocking of the shaft 32. One end of this rock shaft, as shown in Figs. 4 and 7, is provided with a crank arm 36 to which is pivotally connected the forward end of a link bar 37. At its rear end this bar is slotted to straddle a short rotary shaft 38 which is mounted in the main frame and supports the operating handle 18, a gear wheel 39 and a box cam 40. This cam is provided with a pin 41, which when the cam is rotated contacts with the cam edges 42 of a lug 43 formed upon the link 37 so as to force said link forward and thus rock the shaft 32 and disengage all of the detents from the key levers so that the latter may return to their normal positions under the impulses of the springs 28. On the ends of the shaft 32 (see Fig. 2) are loosely mounted pendent arms 107 to each of which is connected a link 108 as shown in Fig. 8, having a hook 109 formed at its rear end. The two bars 107 are joined together by a rod so that the whole device forms a rigid frame, directly in front of arms 35. The hook 109 rests on the shaft 71 and is provided with a square lug 110 coöperating with a cam 111 secured to the shaft 71, this cam being formed with a notch 112 and a reduced portion 113. When the parts are in their normal positions, the keys are free to be depressed, inasmuch as such depression will rock the depending bars 35 which engage the frame rod before referred to. The forward movement of any one of the depending bars 35 will rock the frame arms 107 slightly forward but this will be permitted by the notch 112. After the operation of the machine is commenced, however, the notch 112 passes out of alinement with the lug 110 and the link 108 is thus locked against forward movement. This locking of the link prevents the keys from being depressed, as such depression is impossible unless the link and frame arms 107 can be moved forward. At the period when it becomes necessary to unlock the key levers the reduced portion 113 of the cam is brought into alinement with the lug 110 and the link 108 is then free to move and permit the rocking of the shaft 32 through the means before described.

Each of the key levers 23 coöperates with an independently movable registering lever 23ª which is also journaled on the shaft 24 and is caused to move with its companion key lever by means of a lug 44 formed on the lever 23 and projecting under the lower edge of the lever 23ª.

The relative arrangement of the two levers is such that the initial movement of the lever 23 by its respective key will not move its lever 23ª but will simply move the lug 44 into contact with this latter lever. A further movement, however, of the lever 23 will result in the lever 23ª being elevated. The levers 23 are given this additional movement by means of a common key lever coupling member 45 extending beneath all of the key levers and formed with a longitudinal channel 46. Each of the levers 23 is formed with a nose 48, which when the lever is depressed, passes into such a position that when the key lever coupling member is operated, the upper wall of the channel 46 will engage the top of the nose 48 and force the lever 23 down to elevate the lever 23ª.

The key lever coupler 45 is rocked to secure the above described secondary movement of the key levers, by means of a stud 49 projecting from one end of the same, through a slot formed in the main frame and into the groove 50 of the box cam 40, as plainly shown in Figs. 4 and 7. As the coupler 45 is rocked downward the upper wall of the channel 46 approaches the shaft 24 and thus the noses 48 become coupled to said coupler by passing into the channel 46. The office of the coupler 45 is simply to move the key levers which are set to be coupled thereto at the proper time to cause the levers 23ª to couple with the regular key coupler 14. This coupler is pivotally mounted by suitable trunnions 51 which are journaled in the main frame. A transverse rod or bar 52 forms the operative edge of the coupler and is arranged to enter elongated notches 53 formed in the respective levers 23ª. The operation of the key coupler in connection with these notched levers is old and well known in the art and will need no further description here. The key levers 23 operate through a slotted guide plate 102 mounted upon a cross bar 103 and provided with a series of pivoted wedge shaped key stops 104 best shown in Fig. 9. These key stops are of the construction usually employed in cash registers of this type and their construction and operation is well known and understood. The office of these stops is to prevent more than one key lever in each bank being operated at one time. For this purpose the key stops are arranged in groups or banks corresponding to the respective key banks. There is only sufficient free play between the stops 104 of a particular bank to permit of one key lever passing down between said stops. Thus when one key lever is depressed the stops of that bank are held firmly together so that no other key lever can be forced down between them. Each of the registering levers 23ª is provided at its rear end with a nose 105 which is guided in a suitable slotted plate 106 to prevent any side play of the lever in a manner well known in the art.

Each of the levers 23ª is provided with an integral vertical standard 54 which is formed near its upper end with a lifting shoulder 55 and a locking nose 56. By reference to Fig. 3 it will be seen that the shoulders 55 of the levers of a particular bank are located at different elevations whereby a graduated movement of the registering frames 57 is secured in a manner well known in this art. These frames 57, as best shown in Fig. 5, are pivoted side by side upon a transverse shaft and each of the same is provided with a lateral operating bar 59 and a pivoted latching frame 60. The shoulders 55 of the operated levers engage the bars 59 which latter pass under the noses 56 so that the registering frames move with the levers and are locked against any independent movement.

The office of each of the frames 60 is to lock its registering frame in its normal position. Each of these locking frames is provided with a locking arm 61, which is normally forced into engagement with a transverse stationary bar 62, by a coil spring 63 mounted in a socket of the registering frame and engaging an arm 64 of the locking frame.

When a lever 23ª is operated, its upper edge engages a transverse bar 63ª of its respective locking frame 60 and thereby locks the frame to carry the arm 61 out of engagement with the stationary bar 62. This unlocking of the registering frame takes place just previous to the time when the shoulder 55 of the operated lever engages the rod 59. It will be seen from the above that the frames 57 remain locked at all times unless unlocked by an operated registering lever.

By reference to Figs. 3 and 4 it will be seen that the key coupler 14 normally remains elevated so that any registering levers which have been coupled thereto and elevated, will remain in this position upon the completion of the operation of the machine. To secure this peculiar operation of the coupler, I provide one of the trunnion ends of the same with a crank arm 66 carrying a pin 67, which latter projects into a cam groove 68 of a box cam 69. (See Figs. 4 and 7). This cam 69 is fast to a gear 70 which meshes with a gear 39 and is fast to a rotary shaft 71 mounted in the main frame.

As before stated the registering frames 57 are mounted side by side upon the transverse shaft 58ª. This shaft as best shown in Fig. 5 is formed in two sections which may move independently for a purpose hereinafter described. Mounted upon the adjoining ends of the shaft is a series of segmental gears 72, 73, 74, 75, 76 and 77. The gears 73 and 76 are pinned to their respective shaft sections while the remaining gears are journaled upon said sections. The hundreds of dollars registering frame and the tens of cents registering frame are pinned to their respective shaft sections while the remaining frames are journaled upon said sections. It will be seen from the above that the tens of cents registering frame and the hundreds of dollars registering frame are connected to their respective segmental racks through the shaft sections. The units of dollars and the tens of dollars registering frames are journaled upon the shaft sections so that their respective segmental racks 74 and 75 may be secured directly thereto. The units of cents registering frame is connected to its respective rack by a yoke arm 78 while the clerk's segment 72 is connected to its operating frame by a similar yoke 79. By means of the above described devices the operating racks segments are brought into the proper positions to coöperate with the counter and the indicator operating devices. These latter devices comprise a series of pinions 80 journaled upon a transverse shaft 81 and meshing with their respective rack segments. Each of the pinions 80 is provided with a cam 82 fast thereto. A series of levers 84 are journaled upon a transverse shaft 84ª and are provided with arms 84ᵇ carrying friction rollers 83. These rollers are normally held against the peripheries of cams 82 by a series of coil springs 85 which are connected to the lower ends of the levers 84 and to the connecting rod 86 of a pivoted yoke 87 mounted in the main frame. This yoke is operated by means of a link rod 88 which is pivotally connected to the yoke and is bifurcated at its forward end to straddle the aforesaid shaft 71. The link 88 carries a pin 90 that is engaged by a cam 91 mounted fast on shaft 71. By reference to Fig. 4 the cam and link will be seen in their normal positions. In this position the yoke 87 has been forced as far rearward as possible to put all the springs 85 under tension and hold the rollers 83 firmly against the cams 82. When the rotation of the shaft 71 is started, however, it will be observed that the cam 91 passes out of contact with the pin 90 and thus permits the yoke 87 to move forward and the springs to relax. By this construction the springs are left free during the time the levers 84 are being operated to set the indicators. The springs are not put under tension again until the setting movements are complete, when the frame 87 is again rocked rearward and by extending the springs 85 causes the arms 84 to immediately come to rest with the rollers 83 resting against the cams 82. These cams are so graduated that when operated they will move the levers 84 greater or less distances according to the values of the keys depressed. The upper end of each of the levers 84 is formed into a segmental rack 92. These racks 92 mesh respectively with pinions 93 secured to one of the indicators 15 and 16. As there are two complete sets of these indicators mounted upon the shaft 94 and arranged to indicate on opposite sides of the machine, it is necessary to provide some means for connecting the corresponding indicators of the two sets for simultaneous movement by the racks 92. This means comprises a series of nested sleeves and shafts 95 shown in Figs. 1 2 and 3 and carrying pinions 96 which mesh with gears 97 secured to their respective indicators. This method of connecting the front and back indicators in a cash register is old and well known in the art and it will be readily understood without further description. It will be observed that as the segmental racks connected to the respective registering frames remain in their set positions at the end of the operation of the machine, the cams 82 will also remain so set and will thus hold the indicators in the proper indicating positions until the succeeding operation of the machine when the rack segments and cams are initially returned to their normal positions. While the indicators are positively operated by the cams 82 they are independent of the same and it is thus not necessary that an indicator move back to its zero position each time before it can be again reset. The cams 82 may be returned to normal position and again move toward certain predetermined positions while the indicator is making only a partial return movement. This operation is greatly assisted by the aforedescribed construction for initially releasing the yoke 87 and permitting the springs 85 to contract. The above construction prevents any racking of the indicators and connections such as would result if the indicators and cams were positively connected.

As before stated each of the rack segments 73, 74, 75, 76 and 77 besides actuating an indicator is also arranged to operate one of the counter wheels 98 as the rack is moved in one direction, but to move free of the counter wheel pinions when the rack is moving in the opposite direction. To effect this result the counter wheels are mounted on a movable frame and this frame is rocked backward and forward to move the counter pinions into and out of mesh with the operating rack segments. This rocking of the counter is accomplished by cams 99 and 100 mounted on the rotation shaft 71 and engaging anti-friction rollers 101 and 102[a] mounted on arms projecting from the pivoted counter frame. As the construction and operation of this counter is old and well known no further description will be given here, but reference is made for a more detailed description to the patent to Barnard No. 570,196 in which the counting wheels and transfer devices are of substantially the same construction shown in Fig. 6.

The cash drawer 17 is mounted in the lower part of the frame or casing and is supported by wheels 114 and flanges 115, the latter being secured to the sides of the drawer. (See Fig. 2). The drawer when released is propelled from the casing by a spring 116 situated between the back of the drawer and the back of the casing. The drawer is normally held within the casing by a spring pressed latch plunger 117 best shown in Fig. 10. This plunger is provided at its upper end with a pin 118 which projects into a slot 119 formed in a bell crank lever 120. This lever is journaled on the shaft 24 and is provided at its upper end with an anti-friction roller 121. This roller engages a cam 122 fast to the shaft 71. When the shaft is rotated the bell crank lever is raised and the latch plunger 117 also raised to release the cash drawer at the proper time.

In order to prevent any retrograde movement of the shaft 71 it is provided with a ratchet wheel 123 which is engaged by a spring drawn restraining pawl 124 suitably mounted on the main frame.

I do not care to limit myself to the operation of this machine by a crank handle, as the same may be operated equally well by numerous forms of mechanical motor or electric motor connected to the operating gears.

It will of course be understood that the construction of the key levers and their operating connections for the clerk's key bank is substantially the same as the remaining banks except that about half of the teeth are omitted from the segment 72 so that this segment will only coöperate with its respective indicator pinion 82 and will not engage in the operation of the counter.

The operating handle 18 is provided with any suitable spring stop which is arranged to contact with a stud upon the main frame to arrest the handle in its normal position in a manner well known in the art.

It will of course be understood that the key coupler by passing in front of the registering lever standards locks all of the unoperated registering levers in a manner well understood.

The operation of the machine is as follows: If a sale of five dollars and fifty cents is made, the clerk presses the proper keys 12 and 13. This operation sets the key levers 23 for operation by the common operating member 45. When the handle 18 is operated the coupler 14 is caused to descend until the coupling bar 52 is in its lower position opposite the notches 53. The coupler remains momentarily in its lower position, the coupling member 45 is operated, thus actuating the key levers 23 and the registering levers 23ª to cause the latter to be elevated sufficiently to become coupled to the bar 52 which is immediately moved upward.

Having thus described my invention what I claim as new and desire to secure by Letters Patent is:

1. In a cash register, the combination with indicator operating mechanism arranged to remain in set position at the end of the operation of the machine, indicators connected to said mechanism, a series of graduated levers for operating said mechanism, means for setting said levers for operation, and devices for operating said levers.

2. In a cash register, the combination with a driving mechanism of a series of keys, of a series of key levers, means for operating the key levers when set by the keys, a series of graduated levers arranged to be set by the key levers but operating independently thereof, and a series of indicators controlled by the graduated levers.

3. In a cash register, the combination with a series of keys, of a series of key levers set by said keys, a series of registering levers set by the key levers, means for operating the key levers when set, devices for operating the registering levers when set, and registering devices coöperating with the registering levers.

4. In a cash register, the combination with a driving mechanism of a series of keys, a series of key levers, means for moving the key levers when set by the keys, a series of registering levers set by the key levers but moving independently thereof, and a registering device controlled by the registering levers.

5. In a cash register, the combination with a series of key elements arranged to be set, means for operating said elements when so set, a series of register controlling devices independent of said key elements but set thereby, means for operating the register controlling devices after they are set, and a registering mechanism coöperating with said devices.

6. In a cash register, the combination with a driving mechanism of a series of keys, a series of key levers, a coupling member operating the key levers that have been set by the keys, a series of registering levers set by the key levers but movable independently thereof, and a registering device controlled by the registering levers.

7. In a cash register, the combination with a series of keys, of a series of key levers, a common member for operating the key levers after they are set by the keys, a series of registering levers, a common member for operating the registering levers after they are set by the key levers, and registering devices coöperating with the registering levers.

8. In a cash register, the combination with a series of keys, of a series of key levers, an operating device for actuating the key levers when set by the keys, a series of graduated registering levers, a key coupler operating the registering levers that have been set by the key levers, and a registering device operated by the registering levers.

9. In a cash register, the combination with a series of keys, of a series of key levers, a coupling and operating member for the key levers, a series of registering levers, a coupling and operating member for the registering levers and a registering device controlled by the registering levers.

10. In a cash register, the combination with a series of registering levers arranged to be set for operation, a key coupler, an independent operating mechanism for moving the registering levers into coupling engagement with the coupler and then actuating said coupler, and a registering mechanism controlled by said registering levers.

11. In a cash register, the combination with a series of key levers, of a series of registering levers set thereby, registering devices, and a coupling member for the registering levers normally in an elevated position and arranged when operated to descend and couple to the operated registering lever to elevate the latter.

12. In a cash register, the combination with a series of registering levers, of a register, an operating mechanism, means for setting the levers for operation by the operating mechanism, and a key coupler connected to the operating mechanism and arranged to be first moved to couple the registering levers and then move said levers to effect the registration.

13. In a cash register, the combination with registering devices, of differentially movable mechanism for operating same, indicating mechanism and operating means therefor controlled by said differentially movable mechanism, and means yieldingly holding said operating means in contact with said movable mechanism but adapted to allow independent movement of said movable mechanism.

14. In a cash register, the combination with a series of indicator operating devices, of a series of indicators independent thereof but controlled thereby, an operating mechanism, and spring devices connected to the operating mechanism and controlling the indicators.

15. In a cash register, the combination with a series of indicator operating devices, a series of indicators, a series of pivoted levers connected to the indicators and engaging the indicator operating devices, an operating mechanism, and springs connecting the operating mechanism and said levers.

16. In a cash register, the combination with a series of indicator operating devices, of a series of indicators independent thereof but controlled thereby, spring devices for holding the indicators to coöperation with the operating devices, and means for increasing and decreasing the tension of the spring devices.

17. In a cash register, the combination with a series of indicator operating devices, of a series of indicators independent thereof but controlled thereby, spring devices for holding the indicators to coöperation with the operating devices, an operating mechanism, and means connected to the operating mechanism for increasing or decreasing the tension of the springs.

18. In an indicating machine, the combination with an indicator, of a differentially movable device for controlling the position of said indicator, means for moving said indicator to stop position as determined by said differential device and means for disabling said indicator moving means during the setting movement of said differential setting device.

19. In an indicating machine, the combination with an indicator, of a differentially movable device for controlling the position of said indicator, means for retaining the indicator in contact with said differential device, and means for disabling said retaining means during the setting movement of said differential device.

20. In an indicating machine, the combination with an indicator, of a differentially movable device for controlling the position of the indicator, a spring for causing the indicator to move to stop position as determined by said differential device, and means for disabling the effectiveness of said spring during the setting movements of said differential device.

21. In a cash register, the combination with an operating mechanism, a series of indicators and connections, springs normally tending to return the indicators to normal position, and means for reducing the tension upon the springs while the indicators are being moved away from normal position by the operating mechanism.

22. In a cash register, the combination with a series of indicators, springs tending to return the indicators to normal position, and means for reducing the tension upon the springs while the indicators are being moved away from normal position.

23. In a cash register, the combination with a suitable operating mechanism, of a series of rotary indicators, means intermediate the operating mechanism and indicators and including springs and connections whereby the tensions of the springs are decreased while the indicators are being set.

24. In a cash register, the combination with a series of indicators, springs normally tending to return the indicators to zero position, and means constructed to reduce the tension of the springs while the indicators are being set and again increasing it after they are set.

25. In a cash register, the combination with a series of key levers, of a series of operating devices and connections actuated thereby and arranged to be left in their set positions at the end of the operation of the machine, a counter coöperating with the operating devices, and means intermediate the key levers and operating devices for permitting said devices to remain in their set positions while the key lever is returned to normal position.

26. In a cash register, the combination with a series of key levers and connections, of a series of registering levers arranged to be initially set thereby, registering devices, controlled by the registering levers, means for giving the registering levers a final movement for effecting registration, and means for holding the registering levers in such final positions at the end of the operation of the machine while the key levers return to normal position.

27. In a cash register, the combination with a series of key levers, of a series of registering levers constructed to be set by the key levers but movable independently of the same, means for operating the registering levers constructed to leave them in set positions at the end of the operation of the machine, and registering devices coöperating with the registering levers.

28. In a cash register, the combination with a series of key elements arranged to be set, and means for operating them when set, of a series of registering elements set by the key elements, means independent of the key elements for operating the registering elements when set, and leaving them in operated position while the key elements return to normal position.

29. In a cash register, the combination with a series of registering levers and an operating mechanism, a key coupler, means for giving the registering levers an initial movement to bring the same into position to be engaged by the key coupler, and means connected with the operating mechanism for first moving the key coupler in one direction to restore previously moved registering levers to normal position and then in the other direction to give registering movement to the newly set registering levers whereby to retain the latter in operated position at the end of the operation of the machine.

30. In a cash register, the combination with an operating mechanism and a series of depressible keys, of a series of key levers positioned to give initial movement by said keys, a series of registering levers, connections between the key levers and their corresponding registering levers, means connected with the operating mechanism for giving the key levers a final movement whereby to impart to the registering levers an initial setting movement, a key coupler normally positioned to retain the registering levers in operated position, and means connected with the operating mechanism for moving the key coupler to restore the previously operated registering levers to normal position prior to the initial setting movement of the latter and for then moving the key coupler back to normal position to give the registering levers their final registering movement.

31. In a cash register, the combination with series of operating levers of a series of operating rack segments actuated thereby, a counter coöperating therewith, means for throwing the counter into and out of connection with the segments, a series of indicators connected to the segments, and means for operating said segments whereby they are left in set position at the end of each operation of the machine.

32. In a cash register, the combination with a series of keys, of a series of key elements set by said keys, means for operating said elements when so set, a series of register controlling devices independent of said key elements but set thereby, means for operating the register controlling devices after they are set, and a registering mechanism coöperating with said devices.

33. In a cash register, the combination with a driving mechanism, a series of key levers arranged to have initial and final setting movements, a series of registering levers coöperating therewith and also arranged to have initial and final movements, and registering devices coöperating with the registering levers.

34. In a cash register, the combination with a series of key levers arranged to have initial and final movements, of a series of registering levers set for operation by the final movements of the key levers, means for subsequently operating the registering levers, and registering devices controlled by the registering levers.

35. In a cash register, the combination with a driving mechanism of a series of key levers arranged to have initial and final movements, means for operating said key levers as have been given an initial movement, a series of registering levers set by the key levers but operated independently thereof, and registering devices controlled by the registering levers.

36. In a cash register, the combination with a series of key levers arranged to have initial and final movements, a coupling member for giving the key levers their final movements, a series of registering levers set by the key levers, a movable member for giving the registering levers their final movements, and registering devices coöperating with the registering levers.

37. In a cash register, the combination with a series of key levers having initial and final movements, a series of registering levers set for operation by the final movements of the key levers, a common member for operating the registering levers arranged to lock all unoperated levers, and registering devices coöperating with the registering levers.

38. In a cash register, the combination with a series of registering levers, registering devices coöperating therewith, a series of key levers having initial and final setting movements for setting the registering levers for operation, and means for operating the registering levers when so set.

39. In a cash register, the combination with a series of key levers, of a series of registering levers having a one way lost motion connection with said key levers for operation thereby, means for giving said key levers a movement after said lost motion has been taken up and thereby setting the registering levers, and means for then giving the registering levers a final movement while the key levers return to normal position.

40. In a cash register, the combination with registering devices, of operating levers for same having initial and final movements, key levers having initial and final movements connected loosely to said operating levers, the final movement of said key levers serving to give the initial movement to said registering levers, and means for giving the final movements to both the operating and the registering levers.

41. In a cash register, the combination with an operating mechanism and a series of setting keys, of a series of registering levers arranged to have initial and final movements, means connected with said operating mechanism for giving any registering lever its initial movement when the corresponding key has been depressed, and means also connected with said operating mechanism for giving said registering levers their final movements subsequent to their initial movements.

42. In a cash register, the combination with an operating mechanism and a series of setting keys, of a series of registering levers arranged to have initial and final movements, a series of key levers positioned to be given initial setting movements by the setting keys and having connection with their corresponding registering levers, means connected with the operating mechanism for giving the key levers a final movement whereby to give the registering levers an initial setting movement, and means also connected to the operating mechanism for giving the registering levers their final registering movement.

43. In a cash register, the combination with a series of keys, of a series of key levers, detents for said key levers, an operating mechanism, means connected thereto for operating the key levers, registering devices, a series of registering levers arranged to be set by the key levers, and means connected to the operating mechanism for actuating the registering levers after they are set.

Signed at Dayton, Ohio, this 9th day of December, 1907.

THOMAS CARROLL.

In the presence of two witnesses—

JOHN C. LOCKYER,

CARL W. BENST.